(12) United States Patent
Ohtsu (10) Patent No.: US 7,595,952 B2
(45) Date of Patent: *Sep. 29, 2009

(54) MAGNETIC HEAD EVALUATION APPARATUS AND METHOD FOR MANUFACTURING MAGNETIC DISK DRIVE USING THE SAME

(75) Inventor: Takayoshi Ohtsu, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 26 days.

This patent is subject to a terminal disclaimer.

(21) Appl. No.: 11/880,400

(22) Filed: Jul. 20, 2007

(65) Prior Publication Data

US 2008/0019034 A1    Jan. 24, 2008

(51) Int. Cl.
*G11B 21/02* (2006.01)

(52) U.S. Cl. .......................... 360/75; 360/240
(58) Field of Classification Search ....................... None
See application file for complete search history.

(56) References Cited

U.S. PATENT DOCUMENTS

| | | | | |
|---|---|---|---|---|
| 4,875,117 A | * | 10/1989 | Slezak et al. | 360/98.01 |
| 5,165,082 A | * | 11/1992 | Tomiyama | 360/77.02 |
| 5,189,578 A | * | 2/1993 | Mori et al. | 360/294.6 |
| 5,465,182 A | * | 11/1995 | Ishikawa | 360/75 |
| 6,166,886 A | * | 12/2000 | Toensing | 360/244.5 |
| 6,373,243 B1 | | 4/2002 | Takano et al. | |
| 6,683,744 B2 | | 1/2004 | Takano et al. | |
| 6,693,772 B1 | * | 2/2004 | Wauke et al. | 360/244 |
| 6,930,850 B2 | | 8/2005 | Takagi et al. | |
| 7,466,518 B1 | * | 12/2008 | Bjorstrom et al. | 360/244.5 |
| 2004/0246624 A1 | * | 12/2004 | Hashi et al. | 360/244.2 |
| 2005/0099736 A1 | * | 5/2005 | Utsunomiya | 360/294.4 |

FOREIGN PATENT DOCUMENTS

| | | |
|---|---|---|
| JP | 05-120646 | 5/1993 |
| JP | 2001-110126 | 4/2001 |

* cited by examiner

*Primary Examiner*—Jason C Olson
(74) *Attorney, Agent, or Firm*—Townsend and Townsend and Crew LLP; John Henkhaus (57) ABSTRACT

Embodiments in accordance with the present invention provide a low-priced magnetic head evaluation apparatus capable of evaluating characteristics at high speed. According to one embodiment, a magnetic head evaluation apparatus includes a spindle motor, a VCM actuator as a head moving mechanism, and a ramp mechanism. A spindle motor used in a product HDD is used for the spindle motor. A VCM actuator used in the product HDD is used for the VCM actuator. A ramp mechanism used in the product HDD is used for the ramp mechanism. The apparatus further includes a non-contact type position detector such as a laser length measuring instrument. The non-contact type position detector irradiates a side surface of a load beam with a laser beam. An absolute position of the load beam over a magnetic disk is detected by detecting light reflected off the side surface of the load beam. Mounting of an HGA relative to the load beam is achieved by using a caulking hole in a mount plate.

8 Claims, 10 Drawing Sheets

MAGNETIC HEAD EVALUATION APPARATUS AND METHOD FOR MANUFACTURING MAGNETIC DISK DRIVE USING THE SAME

CROSS-REFERENCE TO RELATED APPLICATION

The instant nonprovisional patent application claims priority to Japanese Patent Application No. 2006-199327 filed Jul. 21, 2006 and incorporated by reference in its entirety herein for all purposes.

BACKGROUND OF THE INVENTION

In order to ensure quality and yield in manufacturing processes for magnetic disk drives (HDDs), it is essential to screen out nonconforming magnetic heads from a finished lot. To that end, HGAs (head gimbal assemblies), in which the magnetic heads are built, are typically subjected to a DET (dynamic electric test). The DET measures such parameters as output, overwrite, resolution, and a track width of the magnetic head, thereby selecting HDDs that are fully operational. To achieve good measurement accuracy in these parameters, a known DET tester includes a high accuracy spin stand, a high accuracy position control system, and a high performance electronic circuit system. The spin stand rotates a disk. The position control system controls the position of the head during read and write operations with high accuracy. The electronic circuit system accomplishes read and write operations with a level of performance equivalent to that of the HDD product. Such a high accuracy spin stand, high accuracy position control system, and high performance electronic circuit system are, however, costly, resulting in a single tester unit costing as much as tens of millions of yen. Preparing testers in large numbers thus requires a tremendous amount of investment.

To reduce the cost of such a high-priced DET tester, a method is being examined whereby components of a product HDD are used as components making up the tester. For example, "The Technical Report of the Institute of Electronics Information and Communication Engineers of Japan", Denshi Joho Tsushin Gakkai Shingaku Giho, Vol. 103, No. 495, MR2003-39-44, pages 1-5 ("Non-patent Document 1") discloses a spin stand which is all but an actual drive designed to facilitate replacement of the magnetic head and the magnetic disk, by carrying over functions of an actual spindle motor and an actual VCM (voice coil motor). Non-patent Document 1 further describes that servo information written in the magnetic disk is demodulated with a PRML (partial response maximum likelihood) chip, thereby allowing the VCM to perform real-time following. Japanese Laid-Open Patent No. 2001-110126 ("Patent Document 1") discloses an arrangement, in which a VCM actuator is used as the magnetic disk evaluation apparatus and which includes a spin stand having a mechanism equivalent to that of an actual HDD. Japanese Patent Publication No. 5-120646 ("Patent Document 2") discloses a magnetic head inspection apparatus including a mechanism that fixes an HGA spacer to a mount with a leading end of a spring.

As described above, an attempt is made to realize a low-priced DET tester by using components of the product HDD even in the known art. In the art as disclosed in Non-patent Document 1, however, to achieve track following, a servo track writer having a high accuracy rotary positioner and an air spindle with a small NRRO (non-repeatable run out) is used to write a servo pattern in a disk for evaluation. This results overall in a large-sized, high-priced evaluation system. Non-patent Document 1 also mentions that the art enables evaluation of heads and disks; however, the HGA is mounted to the actuator arm manually using screws. Patent Document 1 is concerned with a magnetic disk evaluation apparatus, in which it is necessary to write a servo signal in an entire surface of the magnetic disk in advance before position control of the evaluation HGA can be performed. In this apparatus as disclosed in Patent Document 1, the magnetic disk is replaced each time a test is made, but the HGA is generally used until it breaks. Replacement frequency of the HGA is thus extremely low. Accordingly, the HGA is replaced manually by using screws for fixing the HGA on the arm of the VCM actuator. Disadvantageously, however, the magnetic head evaluation apparatus requires that HGA be replaced each time a test is made. From standpoints of productivity and electrical and mechanical damage caused by manual labor, it is not desirable to remove and reinstall the HGA using the screws for each test.

To solve a problem that a magnetic head evaluation apparatus, which incorporates a high accuracy spin stand and a high accuracy head position control system, is extremely expensive.

BRIEF SUMMARY OF THE INVENTION

Figure 2:
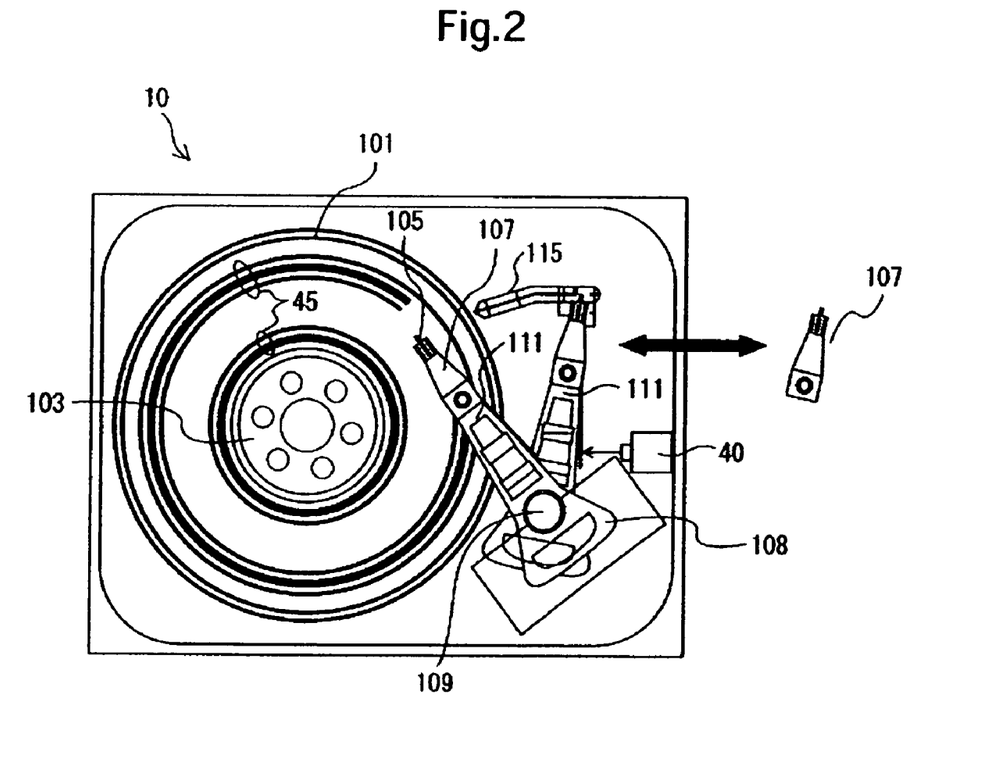
FIG. 2 is a plan view showing the magnetic head evaluation apparatus according to the first embodiment of the present invention.
Figure 3A:
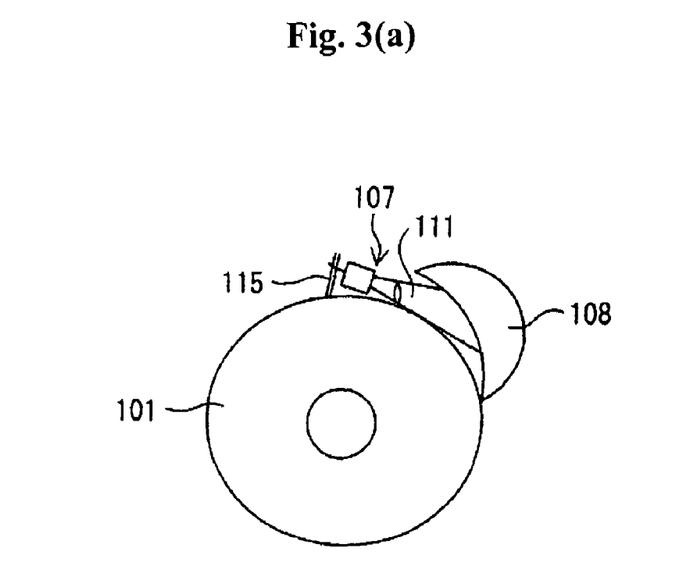
FIGS. 3(a) and 3(b) are plan and side elevational views schematically showing a connection structure between a load beam and an HGA.
Figure 3B:
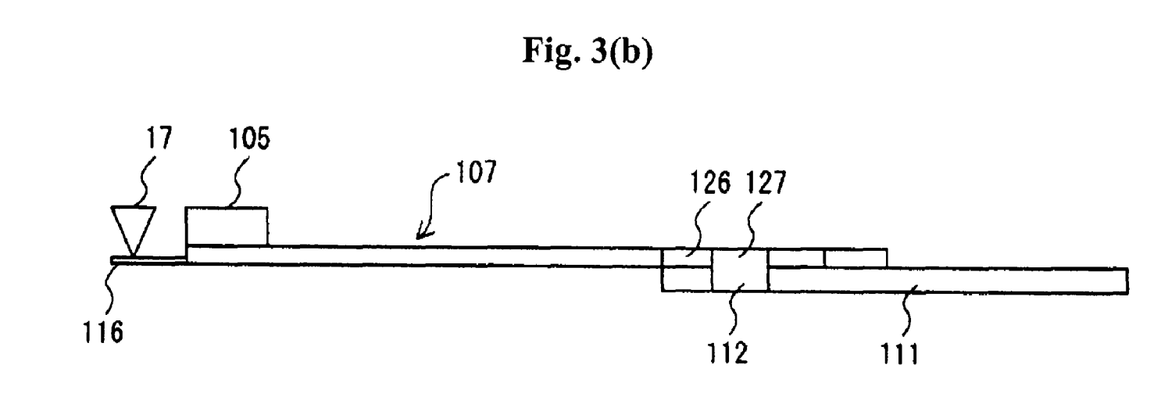

Embodiments in accordance with the present invention provide a low-priced magnetic head evaluation apparatus capable of evaluating characteristics at high speed. According to the particular embodiments disclosed in FIGS. 2 and 3, a magnetic head evaluation apparatus includes a spindle motor, a VCM actuator as a head moving mechanism, and a ramp mechanism. A spindle motor 103 used in a product hard disk drive (HDD) is used for the spindle motor. A voice coil motor (VCM) actuator 108 used in the product HDD is used for the VCM actuator. A ramp mechanism 115 used in the product HDD is used for the ramp mechanism. The apparatus further includes a non-contact type position detector 40 such as a laser length measuring instrument. The non-contact type position detector 40 irradiates a side surface of a load beam 111 with a laser beam. An absolute position of the load beam 111 over a magnetic disk 101 is detected by detecting light reflected off the side surface of the load beam 111. Mounting of an HGA 107 relative to the load beam 111 is achieved by using a caulking hole 127 in a mount plate 126.

DETAILED DESCRIPTION OF THE INVENTION

Embodiments in accordance with the present invention relate to a magnetic head evaluation apparatus mounted in a magnetic disk drive and a method for manufacturing the magnetic disk drive including a magnetic head evaluation process using the magnetic head evaluation apparatus.

It is an object of embodiments according to the present invention to provide a low-priced magnetic head evaluation apparatus capable of evaluating characteristics at high speed.

Another object according to embodiments of the present invention is to provide a method for manufacturing magnetic disk drives including a magnetic head evaluation process that uses the low-priced magnetic head evaluation apparatus capable of making the evaluating characteristics at high speed.

To achieve the foregoing first object, a magnetic head evaluation apparatus according to a first aspect of the present invention uses a spindle motor used in a product HDD as a mechanism for rotatably driving a magnetic disk, a VCM actuator used in the product HDD as a mechanism for driving an HGA, and a non-contact type position detector as a mechanism for detecting a position of a magnetic head held by the HGA above the magnetic disk.

To achieve the foregoing second object, a method for manufacturing a magnetic disk drive according to another aspect of the present invention includes a step of screening a conforming HGA using the magnetic head evaluation apparatus between the steps of mounting a suspension on a magnetic head made to form an HGA and assembling the conforming HGA in an HDD cabinet together with other components.

The first aspect of embodiments in accordance with the present invention can provide a low-priced magnetic head evaluation apparatus capable of evaluating characteristics at high speed. Further, a cost reduction of magnetic disk drives can be achieved by applying this magnetic head evaluation apparatus to a method for manufacturing magnetic disk drives.

Figure 10:
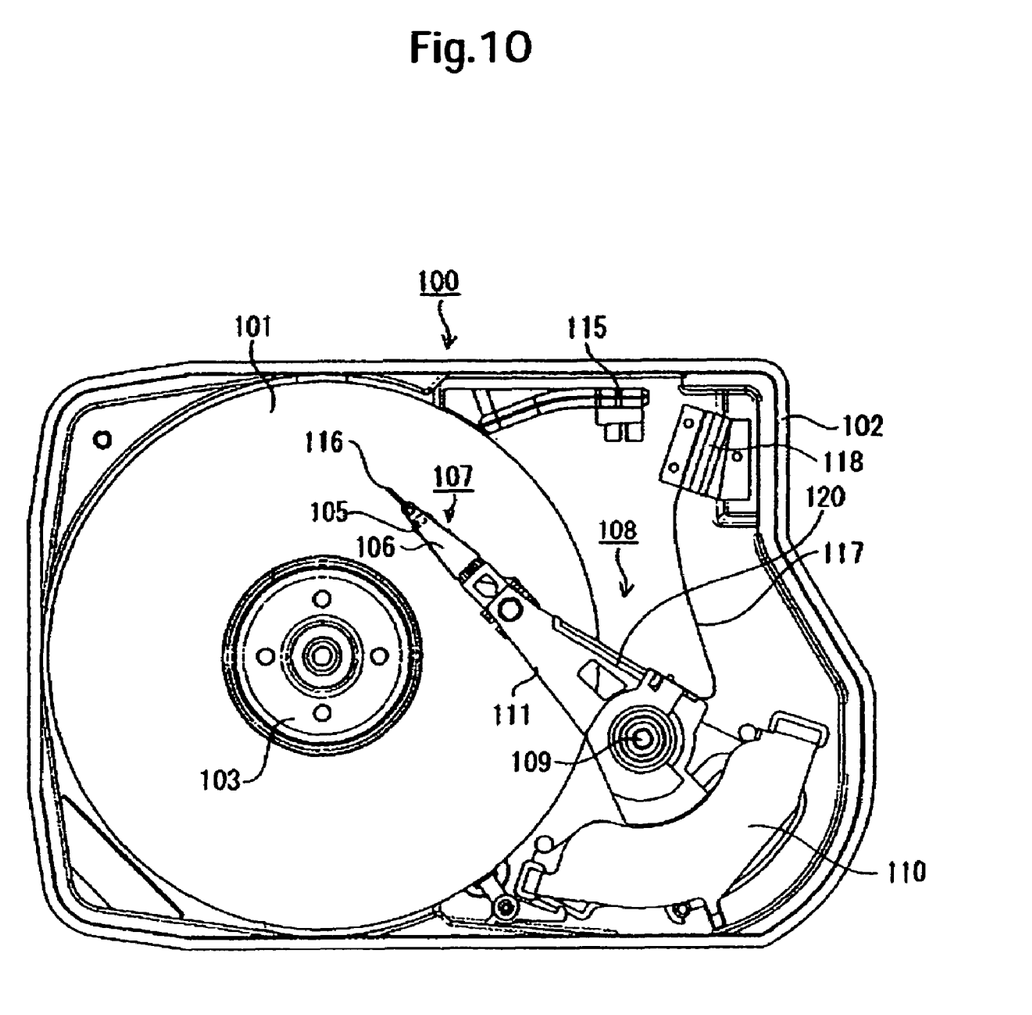
FIG. 10 is a plan view showing an arrangement of the HDD.

A specific embodiment to which the present invention is applied will be described below with reference to the accompanying drawings. In each of the accompanying drawings, components which are constructed identically in different preferred embodiments are assigned identical reference numerals and are not discussed to avoid duplication. Referring first to FIG. 10, a general construction of a magnetic disk drive (HDD) will be described. FIG. 10 is a plan view showing schematically the construction of the HDD.

An HDD 100 includes a magnetic disk 101 and a magnetic head 105. The magnetic disk 101 is housed in a base 102 and stores data therein. The magnetic head 105 accesses the magnetic disk 101. Further, the magnetic head 105 includes a head element portion and a slider. The head element portion reads data from and/or writes data to the magnetic disk 101. The head element portion is formed on the slider. The head element portion includes a write element and/or a read element. The write element converts an electric signal to a corresponding magnetic field according to data written in the magnetic disk 101. The read element translates the magnetic field from the magnetic disk 101 to a corresponding electric signal.

The HDD 100 further includes a VCM actuator 108 that moves the magnetic head 105 to a desired location above the magnetic disk 101. The VCM actuator 108 is driven by a VCM 110, pivotally moving about a pivot 109 to move the magnetic head 105 radially above a spinning magnetic disk 101. This allows the head element portion to access any desired track formed on the magnetic disk 101, thereby reading or writing data. A trace 120 as a transmission line and an FPC 117 transmit signals between the magnetic head 105 and a preamplifier 118.

The base 102 includes a ramp mechanism 115 disposed thereon. When the magnetic disk 101 is brought to a stop, the VCM actuator 108 retracts the magnetic head 105 from a data area to the ramp mechanism 115.

The VCM actuator 108 includes a suspension 106 having springiness. The magnetic head 105 is fixed to the suspension 106 with an adhesive. Pressure produced from viscosity of air between an ABS (air bearing surface) of the magnetic head 105 opposing the magnetic disk 101 and the rotating magnetic disk 101 balances pressure applied by the suspension 106 in a direction of the magnetic disk 101. This allows the magnetic head 105 to fly at a predetermined gap above the magnetic disk 101. The magnetic head 105 and the suspension 106 together form an assembly called a head gimbal assembly (HGA) 107.

Figure 11:
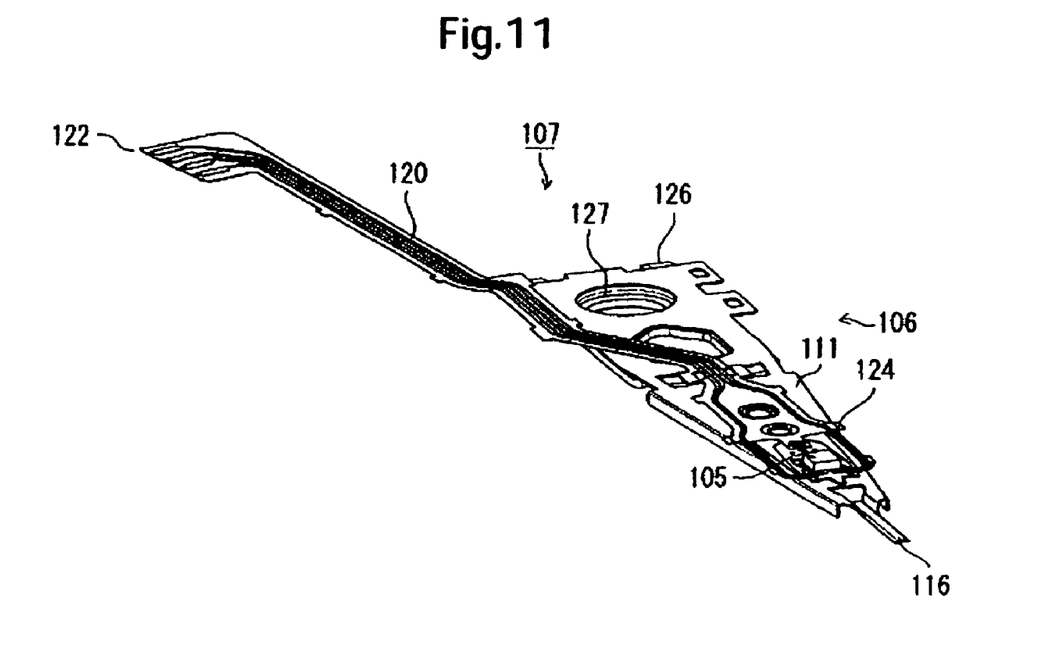
FIG. 11 is a perspective view showing an arrangement of a head gimbal assembly (HGA).

FIG. 11 is a view showing a typical HGA, depicting an arrangement of the HGA as viewed from a side of a recording surface of the magnetic disk 101. Referring to FIG. 11, the HGA 107 includes the magnetic head 105, the suspension 106, and the trace 120 as the transmission line. The trace 120 has an end on which a terminal 122 is formed. The FPC 117 is connected to the terminal 122. The suspension 106 includes a gimbal 124, a load beam 111, and a mount plate 126. The gimbal 124, which is flexible, holds the magnetic head 105 on a side of a magnetic disk opposing surface. The load beam 111 and the mount plate 126 hold the gimbal 124 on the magnetic disk opposing surface side. The HGA 107, of a load/unload type, further includes a lift tab 116 disposed on a leading end of the load beam 111. The lift tab 116 allows the magnetic head 105 to retract to the ramp mechanism 115. A plurality of leads connected to the head element portion is formed on a trailing end surface (on the side of the lift tab 116) of the magnetic head 105. Each of the leads is connected to a corresponding one of wires of the trace 120 through solder or gold ball bonding.

Figure 12:
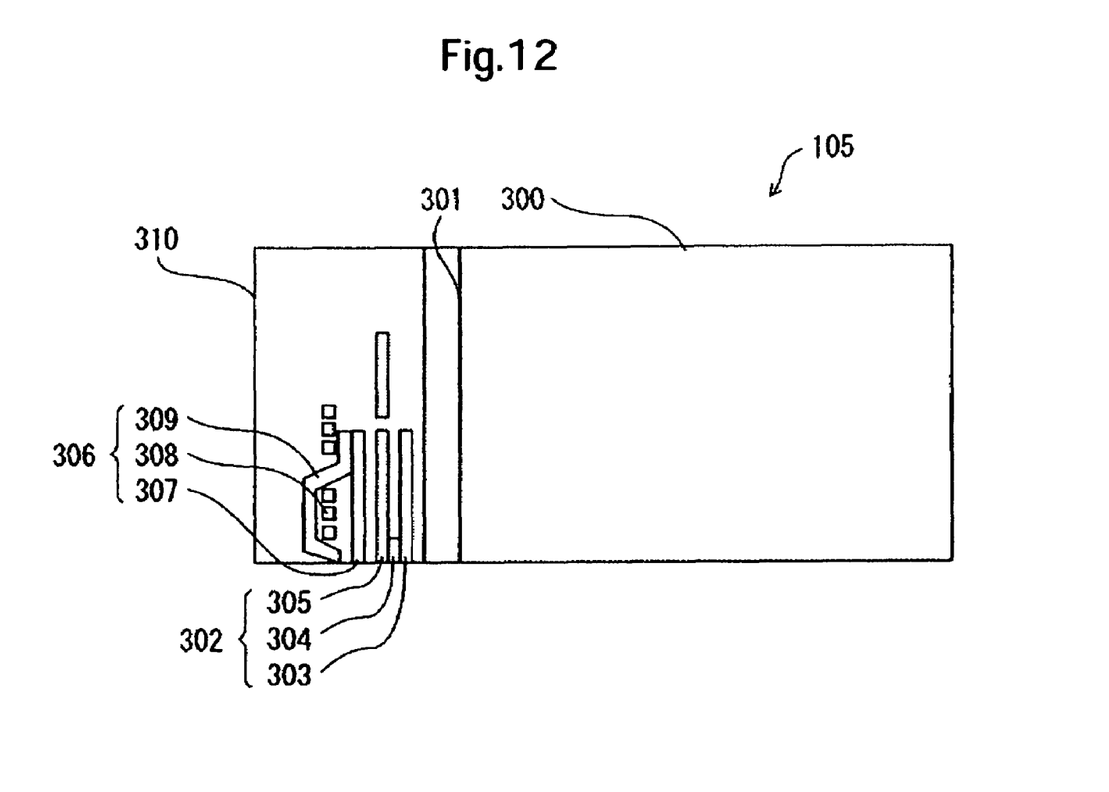
FIG. 12 is a cross-sectional view showing the magnetic head.

FIG. 12 is a cross-sectional view showing the magnetic head 105. A read element 302 and a write element 306 are stacked on an element forming surface 301 of a slider 300. The read element 302 includes a lower magnetic shield 303, a magnetoresistive element 304, and an upper magnetic shield 305. The write element 306, on the other hand, includes a lower magnetic core 307, a coil 308, and an upper magnetic core 309. Though not shown in FIG. 12, leads of the read element 302 and leads of the write element 306 are formed on a trailing end surface 310 of the magnetic head 105.

Figure 1:
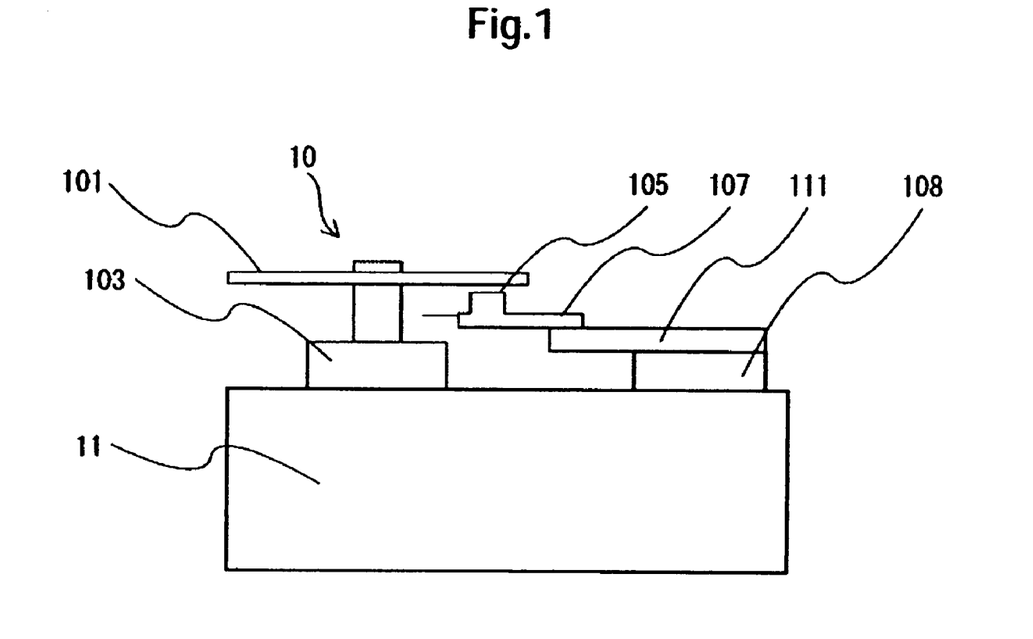
FIG. 1 is a side elevational view showing a magnetic head evaluation apparatus according to a first embodiment of the present invention.

The aforementioned HGA 107 is subjected to the DET during manufacturing processes therefor before being mounted on the HDD 100. FIG. 1 is a side elevational view showing a magnetic head evaluation apparatus according to a first embodiment of the present invention. FIG. 2 is a plan view showing the magnetic head evaluation apparatus according to the first embodiment of the present invention. FIG. 2, however, shows the state where the HGA 107 is disposed above an upper surface of the magnetic disk 101 for evaluation. A magnetic head evaluation apparatus 10 is designed to evaluate the magnetic head 105 for electromagnetic conversion characteristics by mounting the HGA 107 on the VCM arm (load beam) 111 and letting the magnetic head 105 fly above the magnetic disk 101 mounted on and rotated by a spindle motor 103. A spindle motor used in the product HDD is used for the spindle motor 103. A ball bearing or a fluid bearing may be used as a bearing for the spindle motor 103. A VCM actuator used in the product HDD is used for the VCM actuator 108 as a head moving mechanism. A ramp mechanism used in the product HDD is used for the ramp mechanism 115.

Since the VCM actuator cannot have a zero point, it is difficult to detect an absolute position of the VCM actuator. This makes it necessary to perform position recognition for the VCM actuator with reference to a servo signal written on the magnetic disk. It is therefore necessary to write the servo signal throughout an entire surface of the magnetic disk for evaluation. A protracted measurement time, however, results if the servo signal is written on the entire surface of the magnetic disk, based on which the magnetic head is positioned for measurement of the electromagnetic conversion characteristics. The magnetic head evaluation apparatus 10 according to the first embodiment of the present invention therefore includes a non-contact type position detector 40, typically a laser length measuring instrument. Specifically, a side surface of the load beam 111 is irradiated with a laser beam and light reflected off the side surface is detected. The absolute position of the load beam 111 above the magnetic disk 101 is thereby detected. This eliminates the need for writing the servo signal on the entire surface of the magnetic disk 101, thus shortening time required for evaluation.

As described above, the absolute position of the load beam 111 (or the magnetic head 105) above the magnetic disk 101 can be detected without having to refer to the servo signal. Accordingly, a servo signal 45 is written only in an area of the magnetic head 105 which is subjected to evaluation of the electromagnetic conversion characteristics. The servo signal 45 is written by a servo signal write mechanism (controlled by a micro-program) included in the magnetic head evaluation apparatus 10.

The magnetic head evaluation apparatus 10 further includes a servo following mechanism. The servo following mechanism correctly positions the magnetic head 105 at a servo signal write area of the magnetic disk 101. The magnetic head 105 reads and writes a magnetic signal at a position corresponding to the servo signal write area and produces an output of a read signal for an electromagnetic conversion characteristics evaluation unit 11. From the read signal received from the magnetic head 105, the electromagnetic conversion characteristics evaluation unit 11 measures an output level, resolution, overwrite characteristics, write head track width, read head track width, instability, error rate, and the like. The electromagnetic conversion characteristics evaluation unit 11 thereby evaluates the magnetic head 105 whether the head 105 is conforming or not.

A mechanism for mounting the load beam 111 to the HGA 107 will be described with reference to FIGS. 3(a) and 3(b), 4, 5(a) and 5(b), and 6(a) and 6(b). FIGS. 3(a), 3(b), 5(a), 5(b), 6(a), and 6(b) are plan and cross-sectional views schematically showing relationships among the load beam 111, the HGA 107, and the ramp mechanism 115.

FIGS. 3(a) and 3(b), which correspond to FIG. 1, show a condition in which the HGA 107 holding the magnetic head (UP head) 105 is mounted on the load beam 111 of the VCM actuator 108. The UP head 105 is disposed below a lower surface of the magnetic disk 101. The HGA 107 is mounted to the load beam 111 by using a caulking hole 127 in the mount plate 126. Specifically, the load beam 111 is moved to a location away from the ramp mechanism 115. An HGA loading mechanism not shown is then used to move the HGA 107 to a position above the load beam 111. The caulking hole 127 in the mount plate 126 is aligned with a mounting hole 112 in the load beam 111 and the mount plate 126 is clamped onto the load beam 111 using a spring or the like disposed on the load beam 111. Next, the load beam 111 is rotated with the VCM actuator 108, so that the lift tab 116 of the HGA 107 is moved to a ramp portion of the ramp mechanism 115. As noted earlier, the load beam 111 is first moved to a location away from the ramp mechanism 115. This is done to prevent the ramp mechanism 115 from interfering during installation of the HGA 107 because of the UP head 105 being disposed below the lower surface of the magnetic disk 101.

The foregoing description applies to mounting of the UP head. The same mounting procedure applies to a case, in which a DOWN (DN) head is mounted and the DN head is disposed again below the lower surface of the magnetic disk 101, except that the magnetic disk 101 is rotated in an opposite direction for evaluation. When the DN head is to be disposed above an upper surface of the magnetic disk 101 (the same condition as that shown in FIG. 6(b)), the lift tab 116 of the HGA 107 is first brought to the ramp portion of the ramp mechanism 115. The load beam 111 is then rotated to a position opposing the ramp portion of the ramp mechanism 115 and the mount plate 126 is clamped onto the load beam 111. This mounting procedure uses the ramp mechanism 115 for clamping, which facilitates replacement of the HGA 107.

Figure 4:
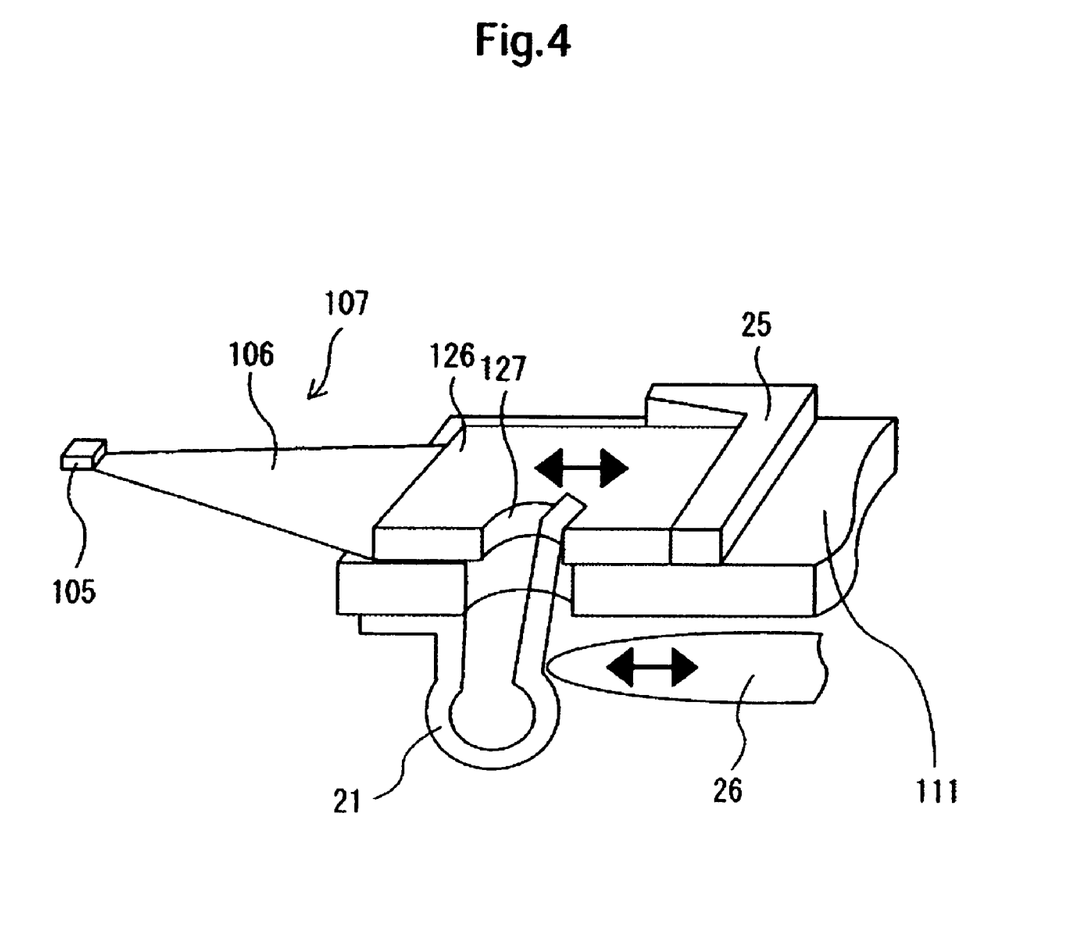
FIG. 4 is a perspective view showing a mechanism for clamping the HGA onto the load beam.

Referring next to FIG. 4, a mechanism for clamping the mount plate 126 of the HGA 107 onto the load beam 111 will be described. A spring 21 has a first end fixed to a lower portion of the load beam 111. The spring 21 has a second end pressed up against a first side of the caulking hole 127 in the mount plate 126. A force of the spring 21 is used for clamping the HGA 107. The force of the spring 21 presses the mount plate 126 up against a stopper 25. The HGA 107 is removed as follows. Specifically, a pusher 26 mounted on a side of the magnetic head evaluation apparatus 10 pushes a curved portion in the spring 21 toward the left as shown in FIG. 4. A leading end of the spring 21 is thereby separated from an end portion of the caulking hole 127. At this time, the HGA 107 is disengaged from restraint by the spring 21. As is evident from the foregoing description, installation and removal of the HGA 107 simply involves pick and place operations of the HGA 107. It is therefore possible to install and remove automatically the HGA using the HGA loading mechanism or the like. It is to be noted that the example of the mechanism for clamping the mount plate 126 onto the load beam 111 is not limited to the above-described arrangement. Rather, any other mechanism may be used as long as such a mechanism incorporates an automatic machine automatically performing the installation and removal procedures.

Figure 5A:
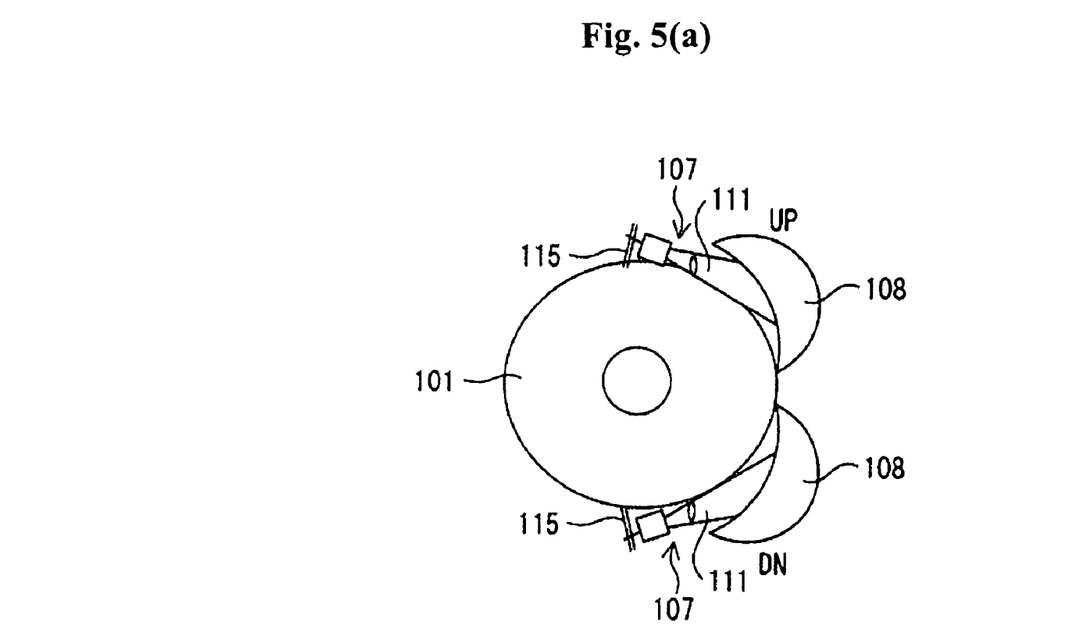
FIGS. 5(a) and 5(b) are plan and side elevational views schematically showing another connection structure between the load beam and the HGA.
Figure 5B:
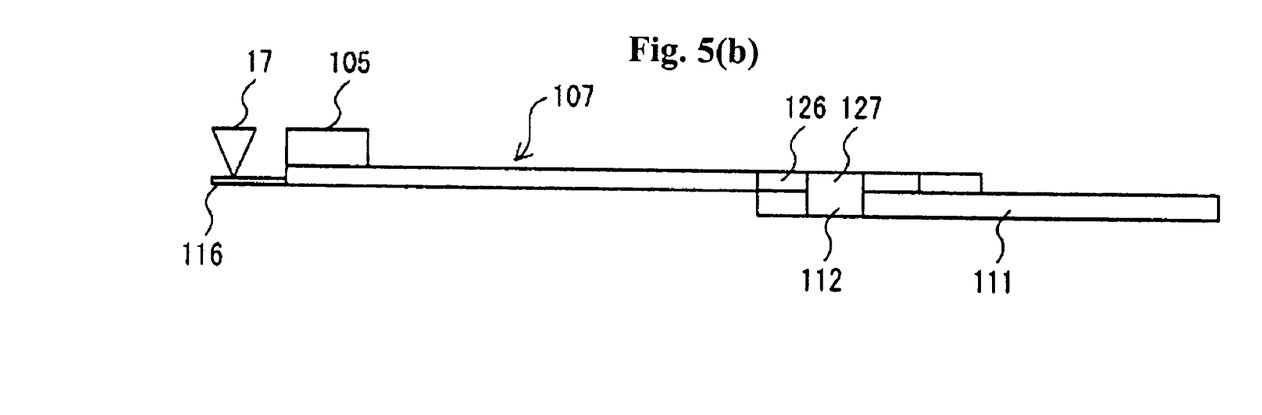

FIGS. 5(a) and 5(b) are views showing an example, in which the UP head and the DN head are mounted to corresponding ones of different VCM actuators, respectively. In this case, mounting of the UP head and the DN head is independent of each other, facilitating the replacement procedure. Both the UP head and DN head are disposed below the lower surface of the magnetic disk 101. Accordingly, as described above with reference to FIGS. 3(a) and 3(b), the mount plate 126 of the HGA 107 is first clamped onto the load beam 111 and the lift tab 116 is then moved to the ramp portion of the ramp mechanism 115.

Figure 6A:
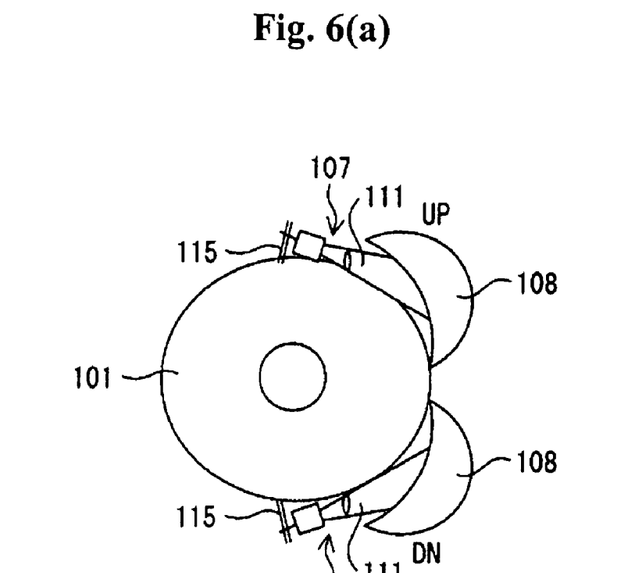
FIGS. 6(a) and 6(b) are plan and side elevational views schematically showing still another connection structure between the load beam and the HGA.
Figure 6B:
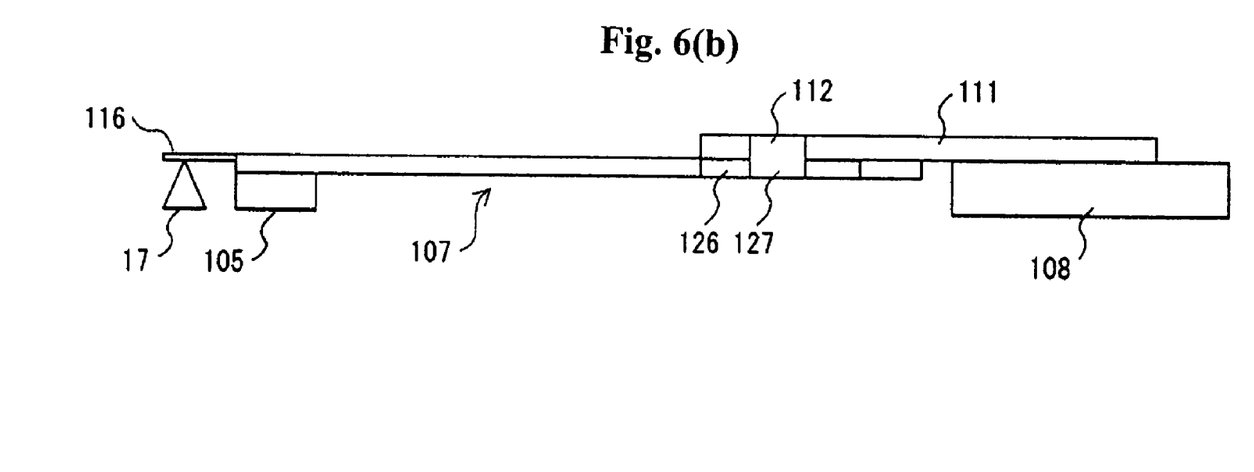

FIGS. 6(a) and 6(b) are views showing an example, in which the UP head and the DN head are mounted to corresponding ones of different VCM actuators, respectively. In this example, both the UP and DN heads are disposed above the upper surface of the magnetic disk 101. In this case, referring to FIG. 6(b), the lift tab 116 of the HGA 107 is first located at the ramp portion of the ramp mechanism 115 and then the mount plate 126 is clamped onto the load beam 111. This mounting procedure uses the ramp mechanism 115 for clamping as described above, which facilitates the replacement of the HGA 107.

Figure 7A:
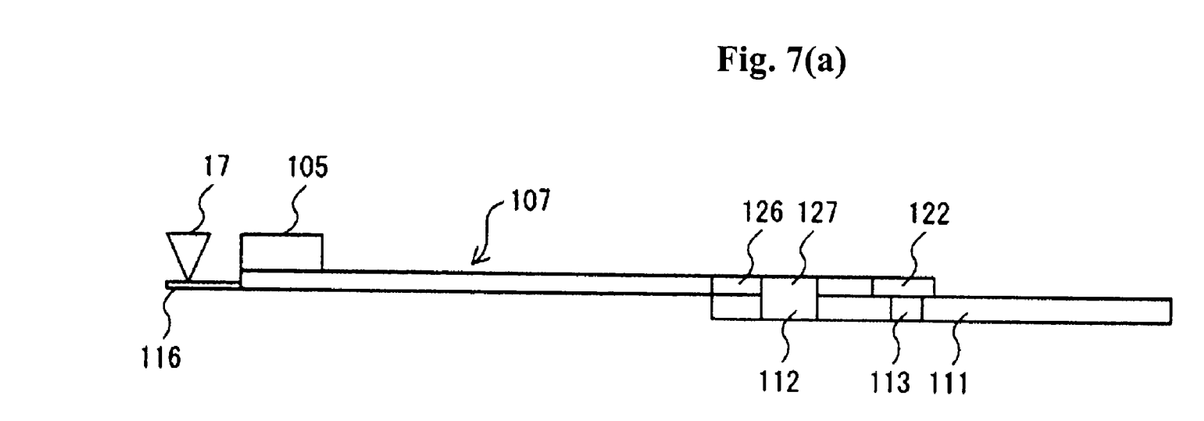
FIGS. 7(a) and 7(b) are side elevational views schematically showing an example of an electrical connection structure between the load beam and the HGA.
Figure 7B:
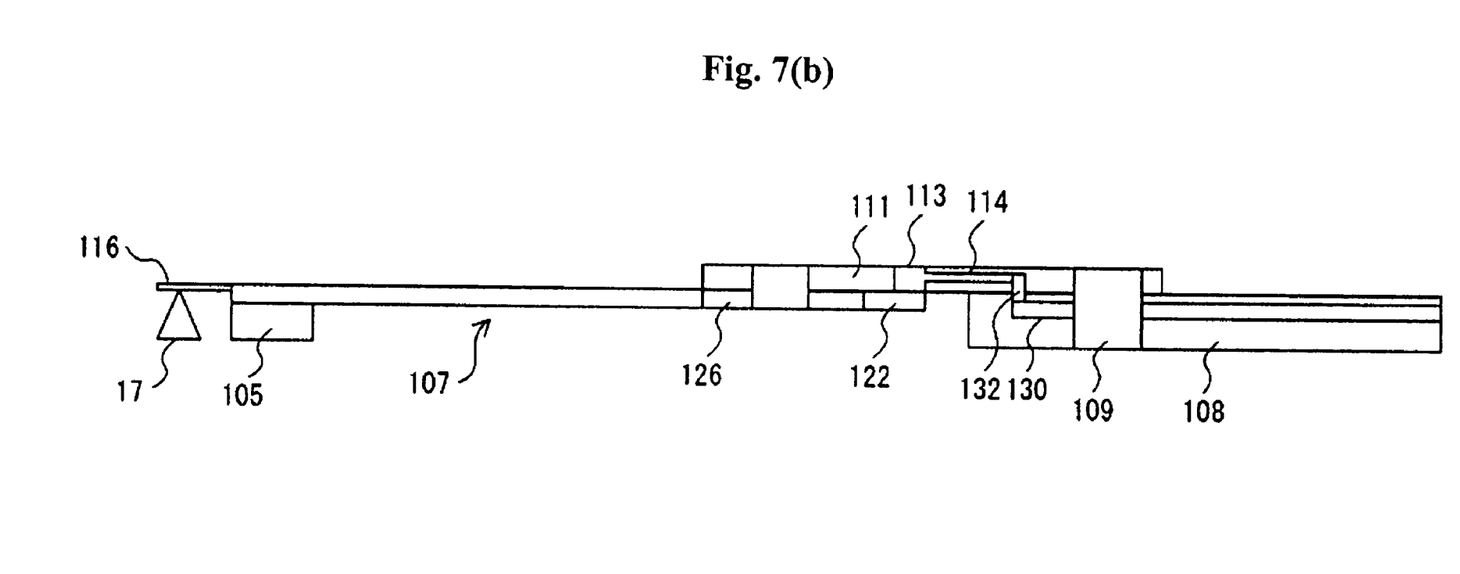

The description given heretofore is concerned with mechanical installation of the HGA 107 onto the load beam 111. For a magnetic head evaluation apparatus, an electrical connection should also be made. FIG. 7(a) is a view showing an example of an electrical connection made of the HGA 107 directly with the load beam 111. An electrical connection terminal 113 connected to the electromagnetic conversion characteristics evaluation unit 11 is disposed on the load beam 111. When the HGA 107 is clamped as described earlier with reference to FIGS. 5(a) and 5(b), the terminal 122 (see FIG. 11) of the HGA 107 is brought into direct contact with the electrical connection terminal 113. FIG. 7(b) is a view showing an example using an auxiliary member (contact probe) 132 as an intermediate connection. The load beam 111 includes an electric wire 114 that leads to the electrical connection terminal 113. The VCM actuator 108 includes an electric wire 130 that is connected to the electromagnetic conversion characteristics evaluation unit 11. When the HGA 107 is clamped by the load beam 111, the electric wire 114 and the electric wire 130 are connected together with the contact probe 132. This arrangement is effective in a case that requires conversion of a surface of the HGA 107 connected to the load beam 111, such as when an electrical connection surface of the HGA 107 differs between the UP head and the DN head. Further, the intermediate connection permits easy handling of the HGA 107, facilitating connection with the VCM actuator 108.

In accordance with the magnetic head evaluation apparatus of the first embodiment of the present invention, the evaluation apparatus uses the spindle motor used in the product HDD and the VCM actuator used in the product HDD. This contributes to a compact and low-priced evaluation apparatus. In addition, the magnetic head evaluation apparatus according to the first embodiment of the present invention includes the non-contact type position detector detecting the position of the load beam above the magnetic disk. This allows the electromagnetic conversion characteristics of the magnetic head to be measured at a specific area of the magnetic disk. This results in measurement of the electromagnetic conversion characteristics being made at high speed. Furthermore, according to the first embodiment of the present invention, the HGA to be evaluated is mounted to the load beam by using the caulking hole in the mount plate. This facilitates the replacement. It further makes possible the replacement performed by an automatic machine, such as an automatic loader of the HGA, enhancing work efficiency.

The magnetic head evaluation apparatus 10 according to the first embodiment of the present invention uses the laser length measuring instrument for the non-contact type position detector. Instead of using the laser length measuring instrument, it is also possible to use a position detector that combines a scale and an optical sensor, one using an electrostatic sensor, and the like. Alternatively, the pivot 109 may include a rotary encoder for detecting the position of the load beam.

Figure 8:
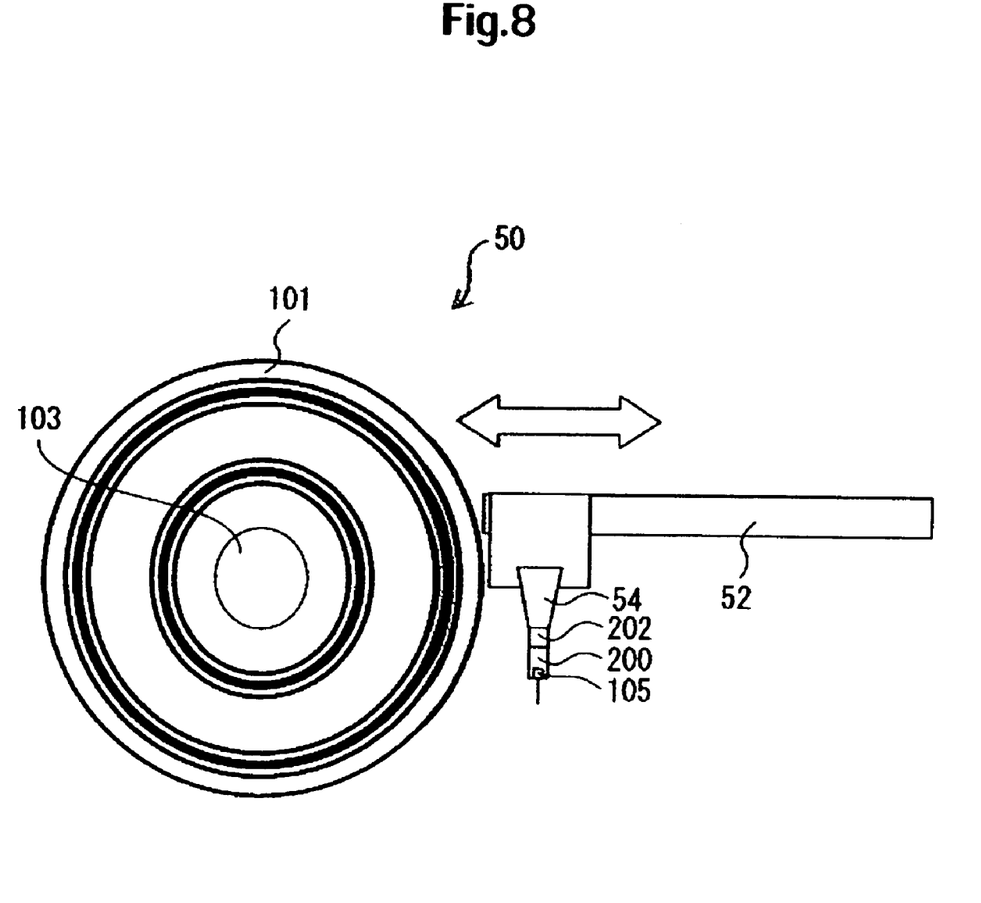
FIG. 8 is a plan view schematically showing a magnetic head evaluation apparatus according to a second embodiment of the present invention.

FIG. 8 is a view showing schematically a general construction of a magnetic head evaluation apparatus 50 according to a second embodiment of the present invention. A spindle motor 103 as used in the product HDD and incorporating a ball bearing or a fluid bearing is used for the spindle motor as in the magnetic head evaluation apparatus 10 according to the first embodiment of the present invention. A linear actuator 52 having a position detection function is used for a head moving mechanism. The linear actuator 52 includes an arm 54 to which the HGA is mounted. An HGA 200 holding a magnetic head 105 to be evaluated is mounted to the arm 54. A microactuator 202 including a piezo element or the like is mounted on the HGA 200. The linear actuator 52 positions the magnetic head 105 radially above a magnetic disk 101. The microactuator 202 accomplishes micropositioning of the magnetic head 105 at the radial position. The magnetic head evaluation apparatus 50 according to the second embodiment of the present invention is otherwise constructed in the same manner as the magnetic head evaluation apparatus 10 according to the first embodiment of the present invention. Further, replacement of the HGA 200 relative to the arm 54 is the same as in the first embodiment of the present invention. Since the magnetic head evaluation apparatus 50 according to the second embodiment of the present invention requires no microactuator, the apparatus can be made at a lower price than the magnetic head evaluation apparatus 10 according to the first embodiment of the present invention.

Figure 9:
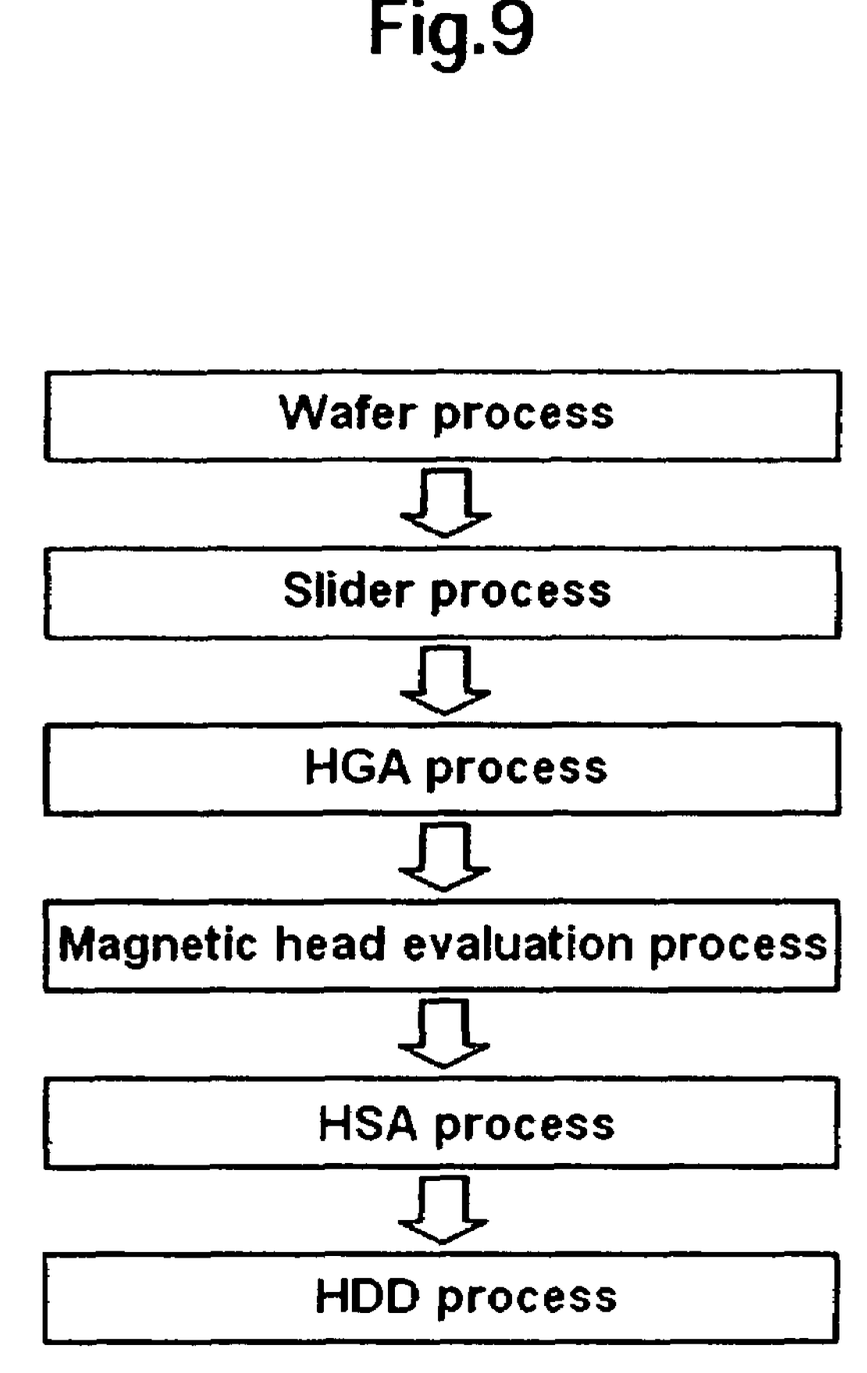
FIG. 9 is a process diagram showing a method for manufacturing an HDD that uses the magnetic head evaluation apparatus according to an embodiment of the present invention.

FIG. 9 shows manufacturing processes for an HDD using the magnetic head evaluation apparatus according to a preferred embodiment of the present invention. The magnetic head is manufactured by being subjected to a wafer process and a slider process. The wafer process forms a read portion and a write portion on a substrate. The slider process cuts a bar from the wafer, which is followed by steps of polishing an air bearing surface, cleaning, forming a protective film, and machining a groove in the air bearing surface. The magnetic head is mounted to a suspension and provided with an electrical connection terminal to become an HGA which is formed by an HGA process. The above-described magnetic head evaluation apparatus is used in a magnetic head evaluation process, in which a conforming HGA is screened out. The conforming HGA, which has been screened out, is mounted to a VCM mechanical part in an HSA process to become an HSA (head stack assembly). The HSA is assembled, with a magnetic disk, a spindle motor, a ramp mechanism, a filter for maintaining cleanness inside the HDD, and the like in an HDD cabinet in an HDD process. An electronic circuit board is then mounted externally to the HDD cabinet. The HDD is thus manufactured. The magnetic disk, the VCM actuator, the electronic circuit board, and the like mounted at this time are equivalent to those used in the magnetic head evaluation apparatus, having the same shapes and functions. Use of the magnetic head evaluation apparatus according to the preferred embodiments of the present invention in the magnetic head evaluation process as described above helps reduce the manufacturing cost of the HDD.

Although the foregoing describes the exemplary preferred embodiments, it should be understood that the present invention is not limited only to those embodiments. Those skilled in the art will recognize various changes, modifications, additions and applications other than those specifically mentioned herein without departing from the spirit of this invention.

What is claimed is:

1. A magnetic head evaluation apparatus, comprising:
a magnetic disk for recording thereon information as a signal;
a mechanism for rotatably driving the magnetic disk;
a magnetic head for writing/reading a signal to/from the magnetic disk;
a head gimbal assembly (HGA) for supporting the magnetic head above the magnetic disk; and
a mechanism for driving the HGA;
wherein a spindle motor used in a product hard disk drive (HDD) is used as the mechanism for rotatably driving the magnetic disk;
wherein a voice coil motor (VCM) actuator used in the product HDD is used as the mechanism for driving the HGA; and
wherein a non-contact type position detector is used as a mechanism for detecting a position of the magnetic head above the magnetic disk;
wherein the VCM actuator includes a load beam and spring having a first end fixed to the bottom of the load beam; and
wherein the HGA is mounted to the load beam using a second end of the spring that presses up against a caulking hole of a mount plate of the HGA.

2. The magnetic head evaluation apparatus according to claim 1,
wherein the non-contact type position detector includes a laser length measuring instrument which irradiates part of the VCM actuator with a laser beam and detects the position of the magnetic head with light reflected off the part of the VCM actuator.

3. The magnetic head evaluation apparatus according to claim 1, further including a servo signal write mechanism and a servo following mechanism,
wherein the magnetic head is positioned at a specific area above the magnetic disk based on an output from the non-contact type position detector; and
wherein the servo signal write mechanism writes a servo signal in the specific area and the servo following mechanism lets the magnetic head follow the specific area for evaluating electromagnetic conversion characteristics.

4. The magnetic head evaluation apparatus according to claim 1, further including a ramp mechanism used in the product HDD,
wherein the HGA is mounted relative to the load beam by using the ramp mechanism.

5. The magnetic head evaluation apparatus according to claim 4,
wherein, if the magnetic head is to be disposed above an upper surface of the magnetic disk, a lift tab on a leading end of the HGA is first placed at the ramp mechanism and the mount plate is then mounted to the load beam.

6. The magnetic head evaluation apparatus according to claim 4,
wherein, if the magnetic head is to be disposed below a lower surface of the magnetic disk, the load beam is moved to a location away from the ramp mechanism and the mount plate of the HGA is mounted to the load beam.

7. A method for manufacturing a magnetic disk drive, comprising the steps of:
manufacturing a magnetic head;
mounting a suspension on the magnetic head to form a head gimbal assembly (HGA);
screening the HGA using a magnetic head evaluation apparatus;
mounting the screened HGA on a first voice coil motor (VCM) actuator; and
assembling a magnetic disk, the first VCM actuator, and a first spindle motor in a hard disk drive (HDD) cabinet;
wherein the magnetic head evaluation apparatus uses a second spindle motor equivalent to the first spindle motor as a mechanism for rotatably driving an evaluation magnetic disk, a second VCM actuator equivalent to the first VCM actuator as a mechanism for driving an HGA to be evaluated, and a non-contact type position detector as a mechanism for detecting a position of the HGA to be evaluated above the evaluation magnetic disk; wherein the second VCM actuator includes a load beam and spring having a first end fixed to the bottom of the load beam; and wherein the HGA is mounted to the load beam using a second end of the spring that presses up against a caulking hole of a mount plate of the HGA.

8. The method according to claim 7,
wherein the non-contact type position detector includes a laser length measuring instrument which irradiates part of the second VCM actuator with a laser beam and detects the position of the HGA to be evaluated with light reflected off the part of the second VCM actuator.

* * * * *

UNITED STATES PATENT AND TRADEMARK OFFICE
CERTIFICATE OF CORRECTION

PATENT NO. : 7,595,952 B2  
APPLICATION NO. : 11/880400  
DATED : September 29, 2009  
INVENTOR(S) : Ohtsu Page 1 of 1

It is certified that error appears in the above-identified patent and that said Letters Patent is hereby corrected as shown below:

Title page, column 1, before (51) Int. Cl. please add (30)    Foreign Application Priority Data July 21, 2006 (JP) .......................... 2006-199327

Signed and Sealed this

Twenty-second Day of December, 2009

David J. Kappos  
*Director of the United States Patent and Trademark Office*